United States Patent
Lee et al.

(10) Patent No.: US 10,779,301 B2
(45) Date of Patent: *Sep. 15, 2020

(54) METHOD FOR TRANSMITTING AND RECEIVING D2D SIGNAL IN WIRELESS COMMUNICATION SYSTEM, AND APPARATUS THEREFOR

(71) Applicant: LG ELECTRONICS INC., Seoul (KR)

(72) Inventors: Seungmin Lee, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/457,725

(22) Filed: Jun. 28, 2019

(65) Prior Publication Data
US 2019/0394788 A1 Dec. 26, 2019

Related U.S. Application Data

(63) Continuation of application No. 15/308,313, filed as application No. PCT/KR2015/004618 on May 8, 2015, now Pat. No. 10,405,329.
(Continued)

(51) Int. Cl.
*H04L 1/18* (2006.01)
*H04W 72/12* (2009.01)
(Continued)

(52) U.S. Cl.
CPC .......... *H04W 72/1205* (2013.01); *H04B 7/26* (2013.01); *H04L 1/18* (2013.01);
(Continued)

(58) Field of Classification Search
CPC ...................................................... H04B 7/26; H04L 1/18; H04L 1/1812; H04L 1/1822; H04L 1/1854; H04W 72/1205; H04W 72/0413
See application file for complete search history.

(56) References Cited

U.S. PATENT DOCUMENTS

2011/0041022 A1 2/2011 Park et al.
2011/0216676 A1 9/2011 Li et al.
(Continued)

FOREIGN PATENT DOCUMENTS

| CA | 2827075 | 10/2012 |
|---|---|---|
| TW | 201412065 | 3/2014 |
| WO | 2014014164 | 1/2014 |

OTHER PUBLICATIONS

U.S. Appl. No. 15/308,313, Final Office Action dated Oct. 19, 2018, 11 pages.
(Continued)

*Primary Examiner* — Anez C Ebrahim
(74) *Attorney, Agent, or Firm* — Lee, Hong, Degerman, Kang & Waimey

(57) ABSTRACT

The present invention relates to a method and an apparatus for transmitting an acknowledgment/negative-acknowledgement (ACK/NACK) of a terminal in a wireless communication system. More specifically, the method comprises the steps of: receiving a wide area network (WAN)-based downlink signal; and transmitting the ACK/NACK in accordance with first hybrid automatic repeat request (HARQ) processes, based on third wireless resources except for at least one second wireless resource for device-to-device (D2D) among first wireless resources for WAN communication, wherein the HARQ processes are characterized in that WAN uplink transmission timing on the second wireless resource is set up to be shifted to the third wireless resource.

10 Claims, 9 Drawing Sheets

Related U.S. Application Data

(60) Provisional application No. 61/991,440, filed on May 9, 2014.

(51) Int. Cl.
  *H04B 7/26* (2006.01)
  *H04W 72/04* (2009.01)
  *H04W 56/00* (2009.01)
  *H04W 84/04* (2009.01)

(52) U.S. Cl.
  CPC .......... *H04L 1/1812* (2013.01); *H04L 1/1822* (2013.01); *H04L 1/1854* (2013.01); *H04W 72/0413* (2013.01); *H04B 7/2656* (2013.01); *H04W 56/002* (2013.01); *H04W 84/042* (2013.01)

(56) References Cited

U.S. PATENT DOCUMENTS

| | | |
|---|---|---|
| 2011/0258313 A1 | 10/2011 | Mallik et al. |
| 2012/0044815 A1 | 2/2012 | Geirhofer et al. |
| 2013/0308598 A1 | 11/2013 | Madan et al. |
| 2014/0269338 A1* | 9/2014 | Jung ...................... H04L 5/0055 370/241 |
| 2015/0237555 A1* | 8/2015 | Kashiwase ............ H04W 36/14 370/329 |
| 2017/0055277 A1 | 2/2017 | Lee et al. |

OTHER PUBLICATIONS

U.S. Appl. No. 15/308,313, Office Action dated Mar. 26, 2018, 17 pages.
PCT International Application No. PCT/KR2015/004618, Written Opinion of the International Searching Authority dated Aug. 24, 2015, 20 pages.
LG Electronics, "Multiplexing of Uu and D2D communication", R1-140335, 3GPP TSG RAN WG1 Meeting #76, Feb. 1, 2014, 7 pages.
Samsung, "Multiplexing between WAN and D2D from system perspective", R1-140394, 3GPP TSG RAN WG1 Meeting #76, Feb. 1, 2014, 5 pages.
Intellectual Property Office of India Application No. 201627037512, Office Action dated May 30, 2019, 6 pages.

\* cited by examiner

FIG. 2
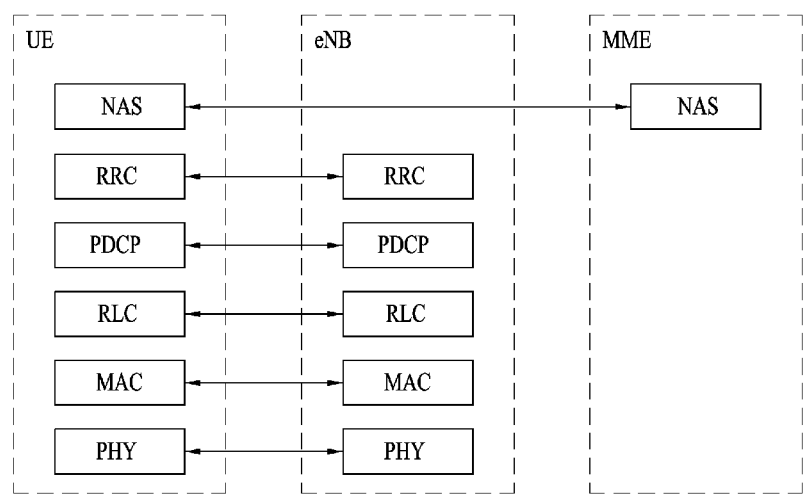
(a) control plane protocol stack
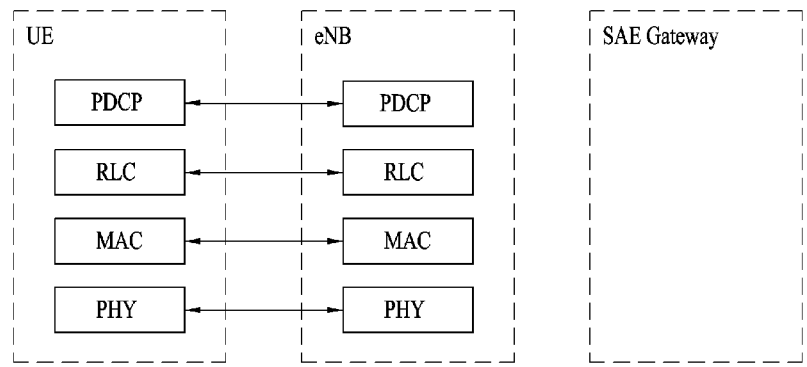
(b) user plane protocol stack FIG. 8
(a) 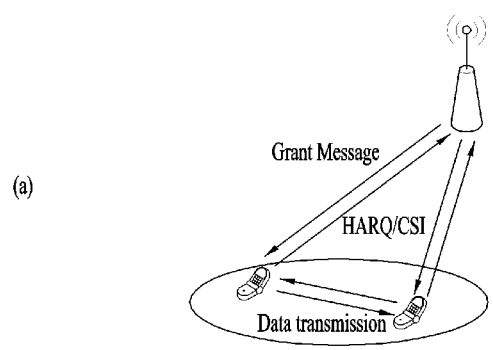
(b) 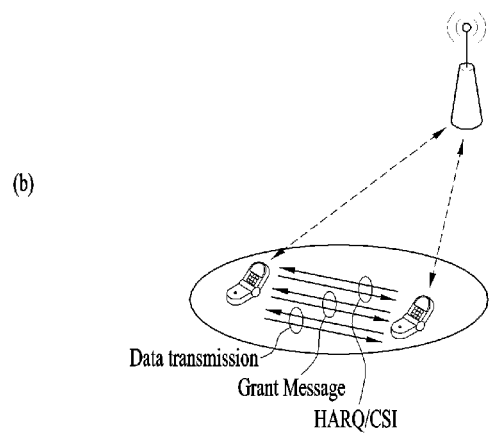

METHOD FOR TRANSMITTING AND RECEIVING D2D SIGNAL IN WIRELESS COMMUNICATION SYSTEM, AND APPARATUS THEREFOR

CROSS-REFERENCE TO RELATED APPLICATIONS

This application is a continuation of U.S. patent application Ser. No. 15/308,313, filed on Nov. 1, 2016, now U.S. Pat. No. 10,405,329, which is the National Stage filing under 35 U.S.C. 371 of International Application No. PCT/KR2015/004618, filed on May 8, 2015, which claims the benefit of U.S. Provisional Application No. 61/991,440, filed May 9, 2014, the contents of which are all hereby incorporated by reference herein in their entirety.

TECHNICAL FIELD

The present invention relates to a wireless communication system, and more particularly, to a method of transmitting and receiving a D2D (device-to-device) signal in a wireless communication system and an apparatus therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist an eNB and efficiently managing a wireless communication system, a UE periodically and/or aperiodically reports state information about a current channel to the eNB. The reported channel state information may include results calculated in consideration of various situations, and accordingly a more efficient reporting method is needed.

DISCLOSURE OF THE INVENTION

Technical Task

Based on the aforementioned discussion, the present invention intends to provide a method of transmitting and receiving a D2D (device-to-device) signal in a wireless communication system and an apparatus therefor.

Technical tasks obtainable from the present invention are non-limited the above-mentioned technical task. And, other unmentioned technical tasks can be clearly understood from the following description by those having ordinary skill in the technical field to which the present invention pertains.

Technical Solution

To achieve these and other advantages and in accordance with the purpose of the present invention, as embodied and broadly described, according to one embodiment, a method of transmitting a signal, which is transmitted using an uplink resource of a user equipment in a wireless communication system, includes the steps of receiving a WAN (wide area network) downlink signal and transmitting a response signal using an uplink resource in response to the WAN downlink signal. In this case, if a WAN signal and a D2D (device-to-device) signal are assigned at the same time, the uplink resource can be configured to transmit the WAN signal.

Preferably, the response signal may correspond to ACK/NACK (acknowledgement/negative-acknowledgement).

To further achieve these and other advantages and in accordance with the purpose of the present invention, according to a different embodiment, a method of transmitting ACK/NACK (acknowledgement/negative-acknowledgement), which is transmitted by a user equipment in a wireless communication system, includes the steps of receiving a downlink signal based on a WAN (wide area network) and transmitting the ACK/NACK according to first HARQ (hybrid automatic repeat request) processes based on third radio resources except at least one second radio resource for D2D (device-to-device) among first radio resources for WAN communication. In this case, the HARQ processes can be configured to shift WAN uplink transmission timing on the second radio resource to the third radio resource.

Preferably, the number of the first HARQ processes can be configured to be greater than the number of second HARQ processes based on the first radio resources.

Preferably, the downlink signal can include a field redefined to indicate identifier information of the first HARQ processes.

Preferably, the downlink signal is received in a subframe n (where, n corresponds to a subframe index) and a subframe n+4 can be included in the third radio resource.

Preferably, the downlink signal is received in a subframe n (where n corresponds to a subframe index), a subframe n+4 is included in the second radio resource, and D2D traffic is not allocated in the subframe n+4.

Preferably, the downlink signal may correspond to a downlink data channel (physical downlink shared channel).

To further achieve these and other advantages and in accordance with the purpose of the present invention, according to a further different embodiment, a user equipment transmitting a signal using an uplink resource in a wireless communication system includes a radio frequency unit and a processor, the processor configured to receive a WAN (wide area network) downlink signal, the processor configured to transmit a response signal using an uplink resource in response to the WAN downlink signal. In this case, if a WAN signal and a D2D (device-to-device) signal are assigned at the same time, the uplink resource can be configured to transmit the WAN signal.

To further achieve these and other advantages and in accordance with the purpose of the present invention, according to a further different embodiment, a user equipment transmitting ACK/NACK (acknowledgement/negative-acknowledgement) in a wireless communication system includes a radio frequency unit and a processor, the processor configured to receive a downlink signal based on a WAN (wide area network), the processor configured to transmit the ACK/NACK according to first HARQ (hybrid automatic repeat request) processes based on third radio resources except at least one second radio resource for D2D (device-to-device) among first radio resources for WAN communication. In this case, the HARQ processes can be configured to shift WAN uplink transmission timing on the second radio resource to the third radio resource.

Advantageous Effects

According to embodiments of the present invention, it is able to efficiently transmit and receive a D2D (device-to-device) signal in a wireless communication system.

Effects obtainable from the present invention may be non-limited by the above mentioned effect. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram illustrating structures of a control plane and a user plane of a radio interface protocol between a user equipment and E-UTRAN based on the 3GPP radio access network standard;

FIG. 8 is a diagram for explaining D2D (UE-to-UE) communication;

BEST MODE

Mode for Invention

Figure 1:
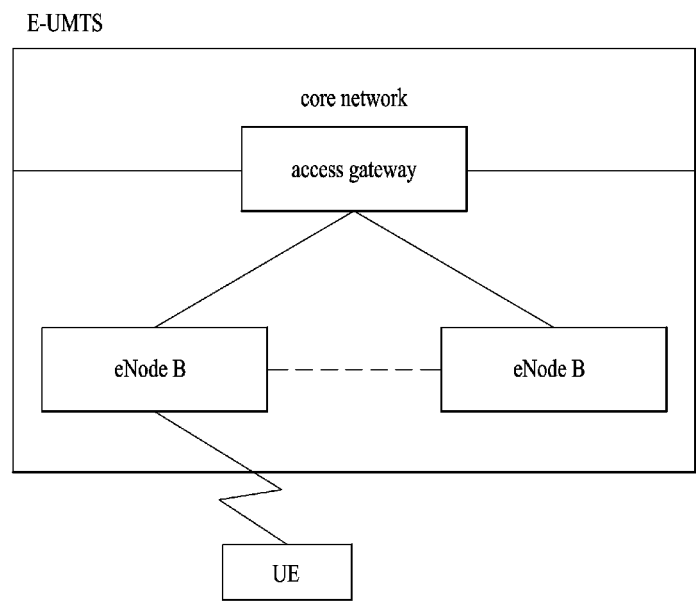
FIG. 1 is a schematic diagram of E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts 01-DMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
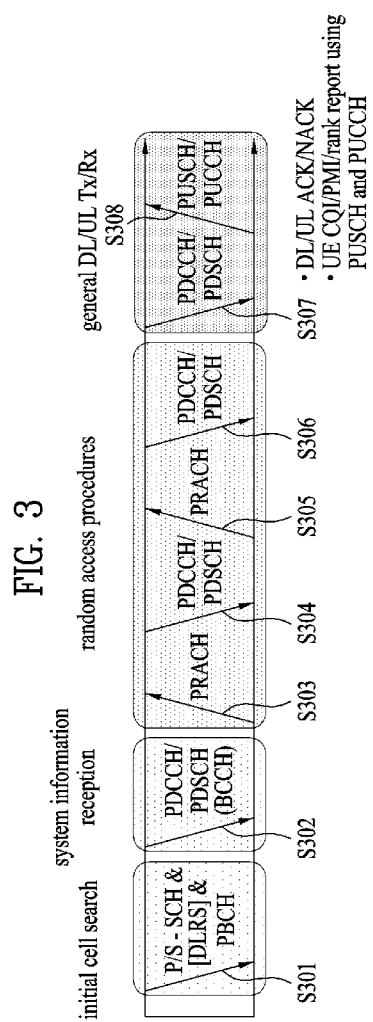
FIG. 3 is a diagram illustrating physical channels used in a 3GPP LTE system and a general method for transmitting a signal using the physical channels.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel.

Having performed the above mentioned procedures, the user equipment may be able to perform a PDCCH/PDSCH reception [S307] and a PUSCH/PUCCH (physical uplink shared channel/physical uplink control channel) transmission [S308] as a general uplink/downlink signal transmission procedure. Control information transmitted from the user equipment to the base station will be commonly referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be simply referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may aperiodically transmit the UCI through the PUSCH in accordance with request/command of the network.

Figure 4:
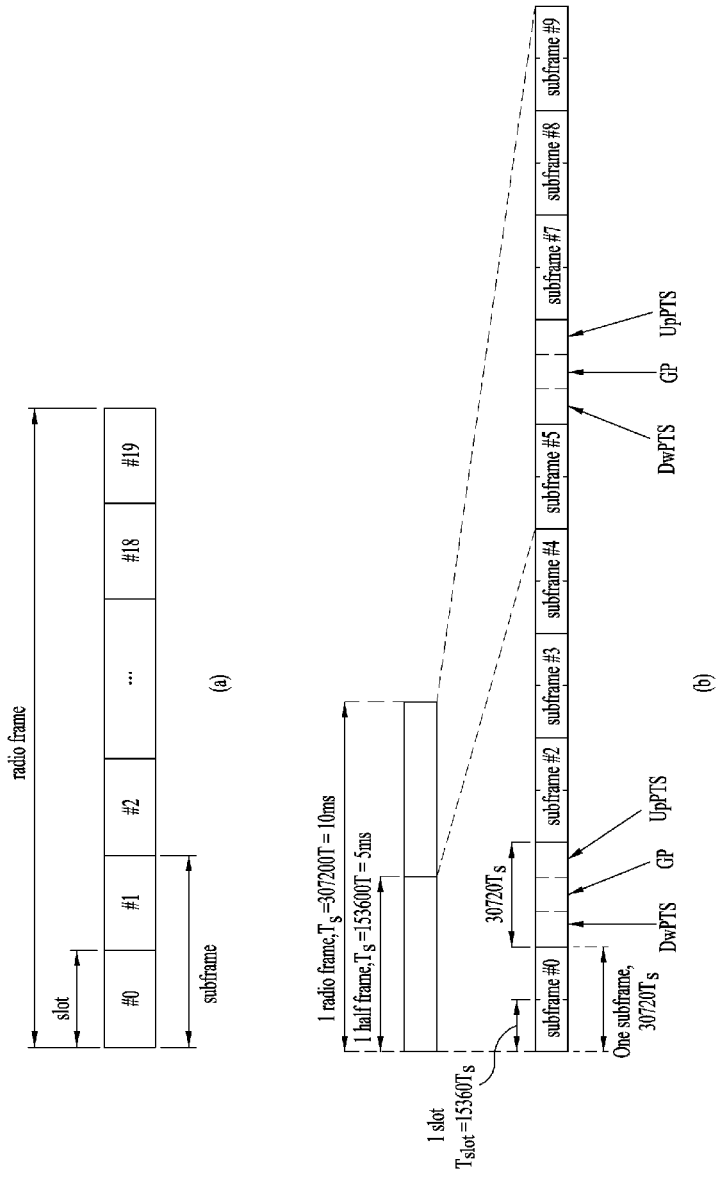
FIG. 4 is a diagram illustrating a structure of a radio frame used in an LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OI-DM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OI-DM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000 \times 2048)$, and the other region is configured for the guard period.

TABLE 1

| Special subframe configuration | Normal cyclic prefix in downlink | | | Extended cyclic prefix in downlink | | |
| --- | --- | --- | --- | --- | --- | --- |
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
| --- | --- | --- | --- | --- | --- | --- | --- | --- | --- | --- | --- |
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
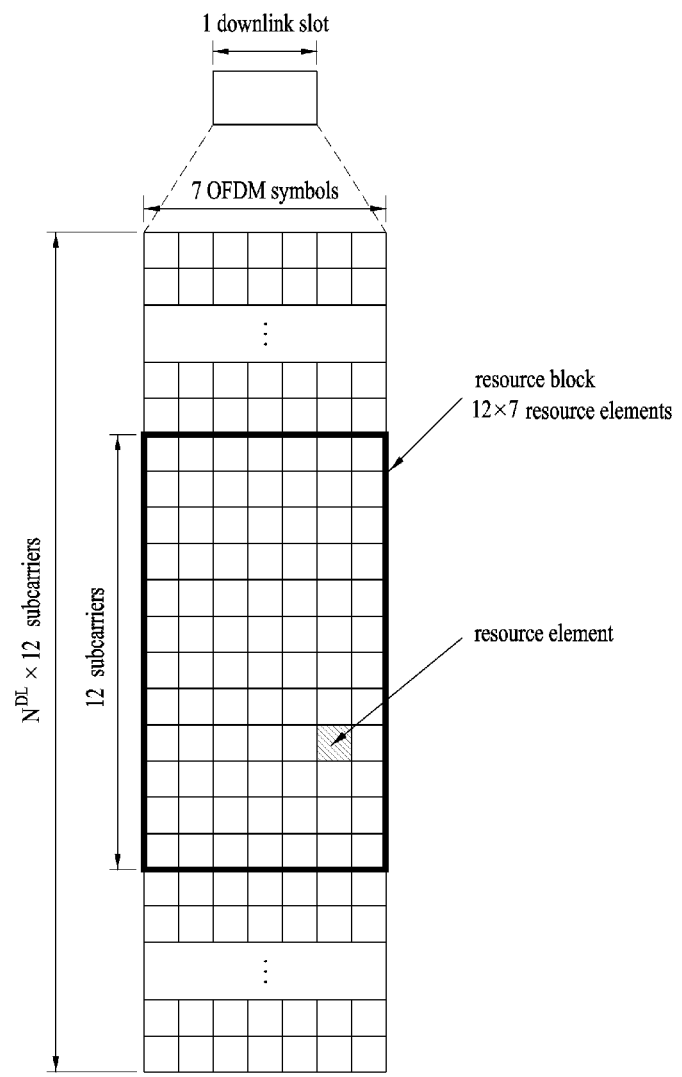
FIG. 5 is a diagram for an example of a resource grid for a downlink slot.

FIG. 5 is a diagram of a resource grid for a downlink slot.

Referring to FIG. 5, a DL slot includes $N_{symb}^{DL}$ OFDM symbols in time domain and $N_{RB}^{DL}$ resource blocks. Since each of the resource blocks includes $N_{sc}^{RB}$ subcarriers, the DL slot includes $N_{RB}^{DL} \times N_{sc}^{RB}$ subcarriers in frequency domain FIG. 5 shows one example that the DL slot includes 7 OFDM symbols and that the resource block includes 12 subcarriers, by which the present invention is non-limited. For instance, the number of OFDM symbols included in the DL slot can be modified according to a length of a cyclic prefix (CP).

Each element on a resource grid is called Resource Element (RE) and 1 single resource element is indicated by a single OFDM symbol index and a single subcarrier index. A single RB is configured with $N_{symb}^{DL} \times N_{sc}^{RB}$ resource elements. The number $N_{RB}^{DL}$ of resource blocks included in the DL slot is dependent on a DL transmission bandwidth configured in a cell.

Figure 6:
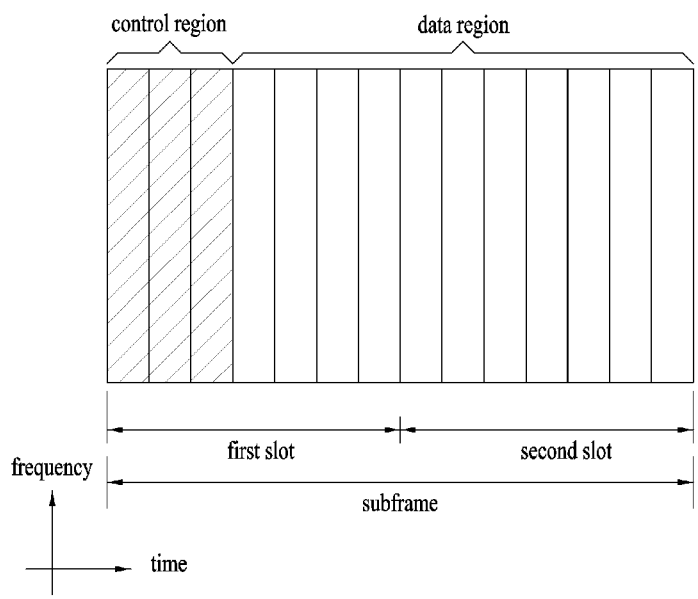
FIG. 6 is a diagram illustrating a structure of a downlink radio frame used in an LTE system.

FIG. 6 is a diagram illustrating a structure of a downlink subframe.

Referring to FIG. 6, maximum three (four) OFDM symbols located at the front of the first slot of the subframe correspond to a control region to which a control channel is allocated. The other OFDM symbols correspond to a data region to which a physical downlink shared channel (PDSCH) is allocated. Examples of downlink control channels used in the LTE system include a Physical Control Format Indicator Channel (PCFICH), a Physical Downlink Control Channel (PDCCH), and a Physical Hybrid ARQ Indicator Channel (PHICH). The PCFICH is transmitted from the first OFDM symbol of the subframe, and carries information on the number of OFDM symbols used for transmission of the control channel within the subframe. The PHICH carries HARQ ACK/NACK (Hybrid Automatic Repeat reQuest acknowledgement/negative-acknowledgement) signals in response to uplink transmission.

The control information transmitted through the PDCCH will be referred to as downlink control information (DCI). The DCI includes resource allocation information for a user equipment or user equipment group. For example, the DCI includes uplink/downlink scheduling information, uplink transmission (Tx) power control command, etc.

The PDCCH may include transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual user equipments (UEs) within a random user equipment group, transmission (Tx) power control command, and activity indication information of voice over Internet protocol (VoIP). A plurality of PDCCHs may be transmitted within the control region. The user equipment may monitor the plurality of PDCCHs. The PDCCH is transmitted on aggregation of one or a plurality of continuous control channel elements (CCEs). The CCE is a logic allocation unit used to provide the PDCCH with a coding rate based on the status of a radio channel. The CCE corresponds to a plurality of resource element groups (REGs). The format of the PDCCH and the number of available bits of the PDCCH are determined depending on the number of CCEs. The base station determines a PDCCH format depending on the DCI which will be transmitted to the user equipment, and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with cell-RNTI (C-RNTI) of the corresponding user equipment. If the PDCCH is for a paging message, the CRC may be masked with a paging identifier (for example, paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI).

Figure 7:
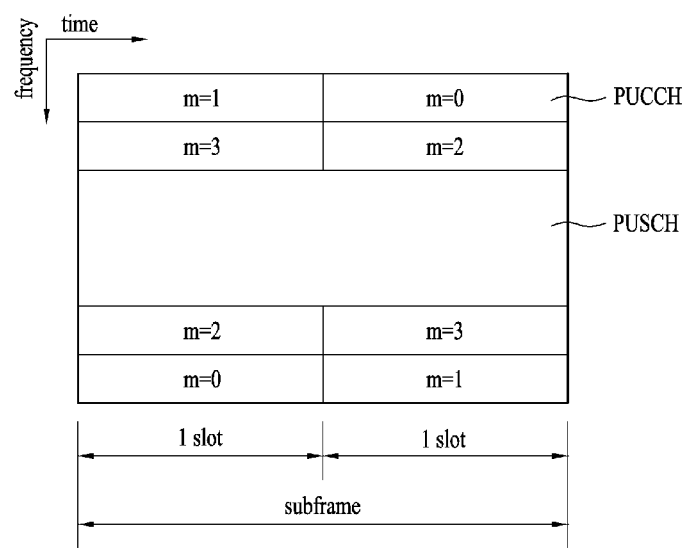
FIG. 7 is a diagram illustrating a structure of an uplink subframe used in an LTE system.

FIG. 7 is a diagram for an example of a structure of an uplink subframe in LTE.

Referring to FIG. 7, an uplink subframe includes a plurality of slots (e.g., 2 slots). A slot can include the different number of SC-FDMA symbols depending on a CP length. An uplink subframe is divided into a data region and a control region in frequency domain. The data region includes PUSCH and is used for transmitting a data signal such as audio and the like. The control region includes PUCCH and is used for transmitting uplink control information (UCI). PUCCH includes an RP pair positioned at both ends of the data region in frequency axis and hops at a slot boundary.

PUCCH can be used for transmitting control information described in the following.

SR (scheduling request): Information used for requesting uplink UL-SCH resource. OOK (on-off keying) scheme is used to transmit the SR.

HARQ ACK/NACK: Response signal for a DL data packet on PDSCH. This information indicates whether or not a DL data packet is successfully received. ACK/NACK 1 bit is transmitted in response to a single DL codeword. ACK/NACK 2 bits are transmitted in response to two DL codewords.

CSI (channel state information): Feedback information on a DL channel CSI includes a CQI (channel quality indicator) and MIMO (multiple input multiple output)-related feedback information includes an RI (rank indicator), a PMI (precoding matrix indicator), a PTI (precoding type indicator) and the like. 20 bits per subframe are used.

An amount of control information (UCI) capable of being transmitted by a user equipment in a subframe is dependent on the number of SC-FDMAs available for transmitting control information. The SC-FDMAs available for transmitting the control information correspond to the remaining SC-FDMA symbols except SC-FDMA symbols used for transmitting a reference signal in a subframe. In case of a subframe to which an SRS (sounding reference signal) is set, a last SC-FDMA symbol of a subframe is also excluded. A reference signal is used for coherent detection of PUCCH.

In the following, D2D (UE-to-UE communication) communication is explained.

A D2D communication scheme is mainly divided into a scheme of receiving help from a network/coordination station (e.g., a base station) and a scheme of not receiving a help from the network/coordination station.

Referring to FIG. 8(a), a network/coordination station involves in transmitting and receiving a control signal (e.g., a grant message), HARQ, channel state information, etc. and data is transmitted and received only between terminals performing D2D communication. And, referring to FIG. 8(b), while a network provides minimum information (e.g., D2D connection information capable of being used in a cell) only, terminals performing D2D communication form a link to transmit and receive data.

Based on the aforementioned contents, the present invention proposes a method of efficiently supporting D2D communication of a D2D UE when D2D (device-to-device) communication is performed by predetermined resources. In this case, the D2D communication means that a UE directly performs communication with a different UE using a radio channel. In this case, although the UE corresponds to a terminal of a user, if such a network device as an eNB transmits and receives a signal according to a communication scheme between UEs, the network device can also be regarded as a sort of UEs.

In the following, for clarity, the present invention is explained based on a 3GPP LTE system. However, a range of systems to which the present invention is applied can be extended to other systems except the 3GPP LTE system. Moreover, embodiments of the present invention can be extensively applied to at least one selected from the group consisting of i) a case that a part of D2D UEs participating in D2D communication is located at the inside of coverage of a network and the rest of D2D UEs is located at the outside of the coverage of the network (D2D discovery/communication of partial network coverage), ii) a case that all of the D2D UEs participating in D2D communication are located at the inside of the coverage of the network (D2D discovery/communication within network coverage), and iii) a case that all of the D2D UEs participating in D2D communication are located at the outside of the coverage of the network (D2D discovery/communication outside network coverage (for public safety only)).

Moreover, since the D2D communication uses an uplink resource transmitted by a UE, the D2D communication transceives interference with WAN (wide area network) communication (i.e., various communications such as PUCCH or PUSCH transmitted to a base station by a UE). Hence, a resource for the D2D communication can be configured/managed in a manner of being separated from a resource for the WAN communication in time domain. However, since the aforementioned operation sets a limit on the total amount of resources usable for the WAN communication, it may reduce performance of the WAN communication. And, in terms of management (e.g., management of WAN DL/UL HARQ timeline) of the WAN communication, a complex scheduling strategy is required in consideration of the resource for the D2D communication.

Hence, various methods for achieving efficient coexistence of the D2D communication and the WAN communication are explained in the embodiments of the present invention. In the following, for clarity, a D2D UE performing a D2D communication reception operation and a D2D UE performing a D2D communication transmission operation are referred to as a "D2D RX UE" and a "D2D TX UE", respectively.

As an embodiment of the present invention, the D2D RX UE can be configured to report identifier (ID) information of D2D TX UEs preferred by the D2D RX UE to a base station to receive D2D signal/data from the D2D TX UEs. Having received the information, the base station can identify i) a D2D TX UE from which D2D signal/data is received and ii) a D2D communication resource in which D2D communication is mainly performed between the D2D RX UE and the D2D TX UE. In particular, the above-mentioned configuration is more efficient when the base station knows resources used for an individual D2D TX UE to transmit a D2D signal/data.

And, (average) reception power or (average) link quality between the D2D RX UE and the D2D TX UE can be restricted to be i) greater than a predetermined threshold or ii) equal to or greater than the predetermined threshold. In other word, although a specific D2D RX UE is interested in a D2D TX UE and intends to receive D2D signal/data from the D2D TX UE, if (average) reception power or (average) link quality between the D2D UEs is not greater than the predetermined threshold, the D2D RX UE does not report identifier information of the D2D TX UE to the base station. In this case, it is able to configure the base station to inform a UE of i) information on the threshold and/or ii) information on a resource used for the D2D RX UE to report identifier information of the D2D TX UEs via a predefined signal (e.g., a physical layer signal or a higher layer signal).

As a different embodiment of the present invention, when a groupcast D2D communication is performed, it may be able to configure a D2D RX UE to report i) identifier information of a group (group ID) to which the D2D RX UE belongs thereto or ii) target identifier (target ID) information. Similarly, having received the information, a base station can identify i) a D2D TX UE performing groupcast-based D2D signal/data transmission from which D2D signal/data is received and ii) a D2D groupcast communication resource in which D2D communication is mainly performed between the D2D RX UE and the D2D TX UE.

As a further different embodiment of the present invention, it may be able to configure a D2D RX UE to report information on resources in which a D2D communication reception operation is mainly performed by the D2D RX UE to a base station among D2D communication resources defined/allocated/scheduled in advance. In this case, the above-mentioned reporting operation can be performed based on a period predefined or signaled in advance and the information can be implemented by a form such as a bitmap of a predefined length (e.g., a value identical to the period). Additionally, it may be able to configure a base station to inform a UE of information on a resource used for the information reporting via a predefined signal (e.g., a physical layer signal or a higher layer signal).

For example, if the aforementioned embodiments of the present invention are applied, the base station is able to identify a location of a D2D communication resource at which a specific D2D RX UE (mainly) performs a D2D communication reception operation. If there exists i) a D2D communication resource not in use or ii) a D2D communication resource of a low use rate among D2D communication resources allocated/scheduled to the specific D2D RX UE, the base station is able to reuse the D2D communication resource for the usage of the WAN communication.

Specifically, assume a case that 8 subframes (e.g., D2D SF#A, D2D SF#B, D2D SF#C, D2D SF#D, D2D SF#E, D2D SF#F, D2D SF#G, and D2D SF#H) are allocated/scheduled to a specific D2D RX UE as a D2D communication resource among 20 subframes. In this case, when the specific D2D RX UE is interested in a D2D TX UE and reports identifier information of the D2D TX UE to a base station to receive D2D signal/data from the D2D TX UE according to the embodiment of the present invention, if it is identified as 4 subframes (e.g., D2D SF#A, D2D SF#C, D2D SF#E, and D2D SF#G) are (mainly) used for D2D communication between the D2D TX UE and the D2D RX UE, the base station is able to reuse the remaining 4 subframes (i.e., D2D SF#B, D2D SF#D, D2D SF#F, and D2D SF#H) for the usage of the WAN communication. In this case, the remaining 4 subframes (i.e., D2D SF#B, D2D SF#D, D2D SF#F, and D2D SF#H) can be used for i) a usage of (re)transmitting (WAN communication-related) PUSCH or ii) a usage of transmitting information on whether or not previously received (WAN communication-related) PDSCH is successfully received (i.e., UL ACK/NACK information), etc.

Specifically, since the base station has identified that the remaining 4 subframes are able to be (re)used for the usage of the WAN communication in the aspect of the specific D2D RX UE, the base station can perform PDSCH transmission at previous timings (i.e., D2D SF#(B-4), D2D SF#(D-4), D2D SF#(F-4), and D2D SF#(H-4) (i.e., DL HARQ timeline of FDD system is assumed)) in consideration of the 4 subframes. In particular, the specific D2D RX UE is able to transmit UL ACK/NACK information at D2D SF#B, D2D SF#D, D2DSF#F and D2D SF#H in response to PDSCH received at D2D SF#(B-4), D2D SF#(D-4), D2D SF#(F-4), and D2D SF#(H-4), respectively.

As a different example, since the base station has identified that the remaining 4 subframes are able to be (re)used for the usage of the WAN communication in the aspect of the specific D2D RX UE, the base station can perform uplink scheduling information (i.e., UL grant information) transmission at previous timings (i.e., D2D SF#(B-4), D2D SF#(D-4), D2D SF#(F-4), and D2D SF#(H-4) (i.e., UL HARQ timeline of FDD system is assumed)) in consideration of the 4 subframes. In particular, the specific D2D RX UE is able to transmit PUSCH at D2D SF#B, D2D SF#D, D2DSF#F and D2D SF#H based on UL grant information received at D2D SF#(B-4), D2D SF#(D-4), D2D SF#(F-4), and D2D SF#(H-4), respectively.

For example, if D2D communication is configured to be performed using a part of uplink resources in which a UE performs WAN communication-related transmission, a D2D UE (and/or a non-D2D advanced WAN UE) may have a restriction in transmitting a legacy DL HARQ timeline-based UL ACK/NACK information (in particular, when a WAN communication resource and a D2D communication resource are separated from each other in time domain).

In this case, the restriction occurred in transmitting the UL ACK/NACK information (i.e., UL SF#(N+4)) indicates that a restriction occurs in receiving PDSCH on WAN communication-related downlink resources (i.e., DL SF#N) as well. Hence, it may lead to a loss of WAN downlink communication performance.

In order to minimize the loss of the WAN downlink communication performance, UL ACK/NACK, which is transmitted in response to PDSCH received at a specific timing, can be shifted (to a different timing) based on a predetermined rule/configuration. To this end, it is necessary to newly configure a DL HARQ RTT (downlink HARQ round trip time) value of a D2D UE (and/or a non-D2D advanced WAN UE) and/or the number of DL HARQ processes. For example, it may be able to reconfigure the DL HARQ RTT value of the D2D UE (and/or the non-D2D advanced WAN UE) and/or the number of DL HARQ processes by 10 and 10, respectively, in a FDD system (i.e., the DL HARQ RTT value and the number of DL HARQ processes are configured by 8 and 8, respectively, in a legacy FDD system).

In this case, if the above-mentioned configuration is applied, it may be able to configure UL ACK/NACK information to be transmitted via a closest non-D2D UL SF (a resource not used for D2D communication or a resource not configured by a D2D communication resource, hereinafter, SF#K) appearing after an SF including (not including) an SF#(N+4) in response to PDSCH received at a specific timing (i.e., DL SF#N). And, retransmission for the PDSCH can be performed in a DL SF#(N+10) in consideration of the newly defined DL HARQ RTT value (i.e., 10).

If the method of newly configuring the DL HARQ RTT value of the D2D UE (and/or the non-D2D advanced WAN UE) and/or the number of DL HARQ processes is applied, it is able to redefine a size of a field that indicates DL HARQ process identifier (ID) information of a DCI format related to downlink scheduling information (i.e., DL grant information) transmission. In this case, the size of the field, which is used for indicating the DL HARQ process identifier (ID) information of the DCI format related to the DL grant information transmission, may increase to 4 bits from 3 bits.

As a further different example, a method of redefining/readjusting a field size can be configured to be restrictively applied to a DCI format related to DL grant information transmitted on USS only. In other word, it may be able to configure a field size (e.g., 3 bits) identical to a legacy field size to be applied to a DCI format related to DL grant information transmitted on CSS.

Additionally, it may be able to configure the D2D UE (and/or the non-D2D advanced WAN UE) to perform a soft buffer division operation in consideration of the increased number of DL HARQ processes.

In the following, D2D performance for a plurality of embodiments proposed by the present invention is explained in detail.

Since priority of WAN is higher than priority of D2D in a subframe in which a UE transmits a WAN signal to an eNB, it is unable to transmit a D2D signal in the subframe (at least on an identical subcarrier) and it is unable to receive a D2D signal in the subframe (at least on an identical subcarrier) due to a half-duplex restriction.

Hence, in case of a FDD system, when a base station schedules uplink transmission (UL TX) in a subframe n (by transmitting PDSCH, UL grant or PHICH NACK), D2D transmission/reception (D2D TX/RX) is unable to be performed in a subframe n+4.

The loss of the D2D performance occurs in two directions. If a WAN TX UE corresponds to a D2D TX UE, all UEs belonging to the coverage of the D2D TX UE are unable to perform a D2D reception operation in a specific subframe. If a WAN TX UE corresponds to a D2D RX UE, all D2D transmission transmitted from D2D TX UEs can be lost in the subframe.

In order to handle the loss of the D2D performance, 4 options can be considered in the present invention under an assumption that "N_b, total number of UEs participate in D2D in every cell, 10 randomly selected UEs have WAN traffic for both downlink and uplink according to an FTP2 model in every cell, and (N_b, total-10) number of UEs do not have WAN traffic in every cell". In the following, for clarity, it is commonly assumed that all uplink subframes are semi-statically divided into two subframe sets separated from each other, one subframe set is used for WAN and another subframe set is used for D2D.

Option 1:
When a base station performs WAN scheduling, the base station may receive no restriction. In other word, if there exist traffic to be transmitted on downlink (DL)/uplink (UL), the base station can transmit PDSCH or a UL grant in every subframe. In this case, D2D performance can be considerably reduced.

Option 2:
If a subframe n+4 is included in a D2D subframe set, the base station may not transmit PDSCH or a UL grant in a subframe n. In this case, D2D performance is not affected. Yet, WAN performance can be reduced due to a scheduling restriction (for protecting D2D TX/RX). If a subframe n+4 is included in a WAN subframe set, there is no restriction in performing WAN scheduling in a subframe n.

Option 3:
If a subframe n+4 is included in a D2D subframe set, the base station can transmit PDSCH or a UL grant in a subframe n on condition. Specifically, the base station checks whether or not a UE participates in a D2D operation in the subframe n+4 before PDSCH or a UL grant is transmitted to the UE. If the UE corresponds to a D2D TX UE and there is no D2D traffic to be transmitted in the subframe n+4, the base station can transmit the PDSCH or the UL grant only. If the UE corresponds to a D2D RX UE and there is no D2D traffic to be transmitted by all D2D TX UEs within a prescribed range (e.g., a link including RSRP equal to or greater than −107 dBm) in the subframe n+4, the base station can transmit the PDSCH or the UL grant only. For example, transmission of PDSCH (related to a specific D2D RX UE) or a UL grant can be configured to be determined in consideration of D2D TX UEs interested by the specific D2D RX UE (or D2D TX UEs intending to perform D2D communication) only (among all D2D TX UEs within the prescribed range from the specific D2D RX UE). In this case, the base station may receive information on the D2D TX UEs interested by the specific D2D RX UE (or the D2D TX UEs intending to perform D2D communication) (e.g., D2D TX UE ID, D2D GROUP ID, i.e., the D2D RX UEs correspond to UEs belonging to the prescribed range from the specific D2D RX UE) via a predetermined channel/signal. Compared to the aforementioned option 2, a WAN communication-related scheduling restriction can be reduced according to D2D traffic status, thereby increasing WAN performance. If the subframe n+4 belongs to the WAN subframe set, there is no restriction in performing WAN scheduling.

Option 4:

When downlink scheduling is performed, the option 4 is specifically applied. In this case, uplink HARQ-ACK timing is shifted to make HARQ-ACK to be transmitted in a subframe for WAN communication. As a result, a base station can transmit PDSCH in a random downlink subframe and uplink HARQ-ACK (transmission) corresponding to the PDSCH does not affect a D2D operation. Due to the HARQ-ACK timing shift, HARQ RTT may increase. For clarity, 10 HARQ processes are assumed for the option 4 in the following.

In the following, results according to the aforementioned 4 options are compared with each other with reference Tables 3 and 4. First of all, Table 3 shows downlink processing performance in case that there exist 3 D2D TX UEs per cell.

TABLE 3

| X % D2D SFs | Scenario | UE Avg. Pkt Thpt [Kbps] | Gain | Y-percentile UE Pkt Thpt [Kbps] | | | | | |
|---|---|---|---|---|---|---|---|---|---|
| | | | | Y = 5 | Gain | Y = 50 | Gain | Y = 95 | Gain |
| X = 20 | Option 1 | 10497 | N/A | 2262 | N/A | 7642 | N/A | 31508 | N/A |
| | Option 2 | 7605 | −28% | 1727 | −24% | 5361 | −30% | 23011 | −27% |
| | Option 3 | 7732 | −26% | 1771 | −22% | 5498 | −28% | 21927 | −30% |
| | Option 4 | 10006 | −5% | 2205 | −3% | 7262 | −5% | 28958 | −8% |
| X = 40 | Option 1 | 10497 | N/A | 2262 | N/A | 7642 | N/A | 31508 | N/A |
| | Option 2 | 5280 | −50% | 1211 | −46% | 3690 | −52% | 15171 | −52% |
| | Option 3 | 5918 | −44% | 1377 | −39% | 4104 | −46% | 16718 | −47% |
| | Option 4 | 10006 | −5% | 2205 | −3% | 7262 | −5% | 28958 | −8% |
| X = 60 | Option 1 | 10497 | N/A | 2262 | N/A | 7642 | N/A | 31508 | N/A |
| | Option 2 | 2904 | −72% | 802 | −65% | 1956 | −74% | 8794 | −72% |
| | Option 3 | 4258 | −59% | 999 | −56% | 2764 | −64% | 13003 | −59% |
| | Option 4 | 10006 | −5% | 2205 | −3% | 7262 | −5% | 28958 | −8% |

Subsequently, Table 4 shows downlink processing performance in case that there exist 6 D2D TX UEs per cell.

TABLE 4

| X % D2D SFs | Scenario | UE Avg. Pkt Thpt [Kbps] | Gain | Y-percentile UE Pkt Thpt [Kbps] | | | | | |
|---|---|---|---|---|---|---|---|---|---|
| | | | | Y = 5 | Gain | Y = 50 | Gain | Y = 95 | Gain |
| X = 20 | Option 1 | 10497 | N/A | 2262 | N/A | 7642 | N/A | 31508 | N/A |
| | Option 2 | 7605 | −28% | 1727 | −24% | 5361 | −30% | 23011 | −27% |
| | Option 3 | 7899 | −25% | 1668 | −26% | 5580 | −27% | 22630 | −28% |
| | Option 4 | 10006 | −5% | 2205 | −3% | 7262 | −5% | 28958 | −8% |
| X = 40 | Option 1 | 10497 | N/A | 2262 | N/A | 7642 | N/A | 31508 | N/A |
| | Option 2 | 5280 | −50% | 1211 | −46% | 3690 | −52% | 15171 | −52% |
| | Option 3 | 5710 | −46% | 1267 | −44% | 3959 | −48% | 16583 | −47% |
| | Option 4 | 10006 | −5% | 2205 | −3% | 7262 | −5% | 28958 | −8% |
| X = 60 | Option 1 | 10497 | N/A | 2262 | N/A | 7642 | N/A | 31508 | N/A |
| | Option 2 | 2904 | −72% | 802 | −65% | 1956 | −74% | 8794 | −72% |
| | Option 3 | 3716 | −65% | 875 | −61% | 2334 | −69% | 11285 | −64% |
| | Option 4 | 10006 | −5% | 2205 | −3% | 7262 | −5% | 28958 | −8% |

Figure 9:
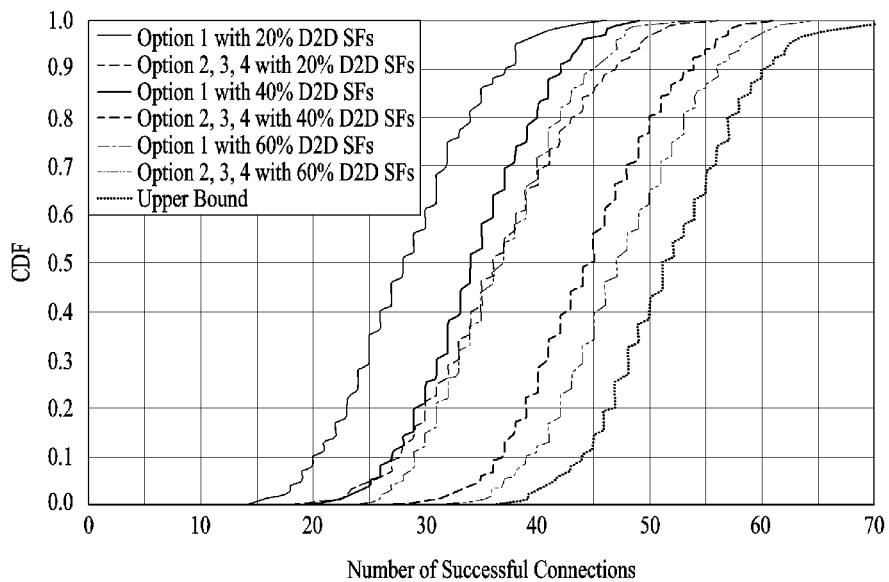
FIGS. 9 and 10 are diagrams for explaining a result of embodiments according to the present invention.
Figure 10:
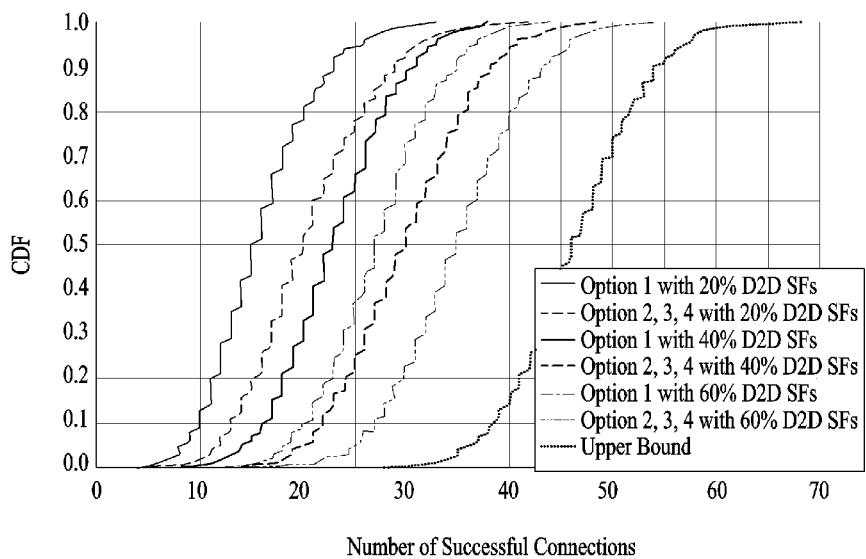

FIG. 9 shows D2D performance in case that there exist 3 D2D TX UEs per cell and FIG. 10 shows D2D performance in case that there exist 6 D2D TX UEs per cell. In FIGS. 9 and 10, a vertical axis indicates CDF (cumulative distribution probability) and a horizontal axis indicates the number of successful connections.

First of all, as shown in FIGS. 9 and 10, it is able to see that D2D performance according to the option 1 is very low. This is because the considerable amounts of D2D subframes are lost. On the contrary, it is able to see that WAN performance according to the option 2 is considerably reduced. This is because scheduling of an eNB is restricted. And, compared to the option 2, it is able to see that WAN performance according to the option 3 is increased. In particular, it is able to see that the WAN performance is increasing when more subframes are allocated to D2D to maintain identical D2D performance. However, the WAN performance is still low compared to the option 1. Consequently, it is able to see that the option 4 secures D2D performance of a level similar to a level of the D2D performance of the options 2 and 3 and provides WAN downlink performance similar to that of the option 1.

Hence, according to the present invention, it may be able to obtain results described in the following.

- If an eNB performs scheduling, which triggers WAN TX in a subframe n+4 configured as a D2D subframe, in a subframe n, since priory of WAN is higher than priority of D2D, D2D performance is considerably degraded.
- When a subframe n+4 is configured as a D2D subframe, if an eNB evades transmitting PDSCH in a subframe n, WAN downlink performance is considerably degraded due to the loss of downlink subframes.
- If HARQ-ACK timing is shifted to make uplink HARQ-ACK to be transmitted in a subframe which is not configured as a D2D subframe, it is able to secure both WAN downlink performance and D2D performance.

Moreover, since the embodiments of the present invention correspond to one of implementation methods of the present invention, it is apparent that the embodiments of the present invention are considered as a sort of proposed schemes. Although the aforementioned proposed schemes can be independently implemented, and the aforementioned proposed schemes can also be implemented in a combination (aggregation) form of a part of the proposed schemes.

Figure 11:
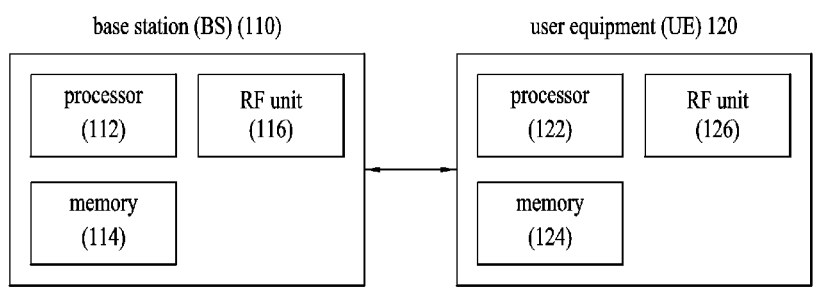
FIG. 11 is a diagram for a base station and a user equipment applicable to one embodiment of the present invention.

FIG. 11 is a diagram for a base station and a user equipment applicable to one embodiment of the present invention.

If a relay is included in a wireless communication system, communication is performed between a base station and the relay in backhaul link and communication is performed between the relay and a user equipment in access link. Hence, the base station and the user equipment shown in the drawing can be replaced with the relay in accordance with a situation.

Referring to FIG. 11, a wireless communication system includes a base station (BS) 110 and a user equipment (UE) 120. The BS 110 includes a processor 112, a memory 114 and a radio frequency (RF) unit 116. The processor 112 can be configured to implement the proposed functions, processes and/or methods. The memory 114 is connected with the processor 112 and then stores various kinds of information associated with an operation of the processor 112. The RF unit 116 is connected with the processor 112 and transmits and/or receives a radio signal. The user equipment 120 includes a processor 122, a memory 124 and a radio frequency (RF) unit 126. The processor 122 can be configured to implement the proposed functions, processes and/or methods. The memory 124 is connected with the processor 122 and then stores various kinds of information associated with an operation of the processor 122. The RF unit 126 is connected with the processor 122 and transmits and/or receives a radio signal. The base station 110 and/or the user equipment 120 may have a single antenna or multiple antennas.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

In this disclosure, a specific operation explained as performed by a base station may be performed by an upper node of the base station in some cases. In particular, in a network constructed with a plurality of network nodes including a base station, it is apparent that various operations performed for communication with a user equipment can be performed by a base station or other networks except the base station. 'Base station (BS)' may be substituted with such a terminology as a fixed station, a Node B, an eNode B (eNB), an access point (AP) and the like.

Embodiments of the present invention can be implemented using various means. For instance, embodiments of the present invention can be implemented using hardware, firmware, software and/or any combinations thereof. In the implementation by hardware, a method according to each embodiment of the present invention can be implemented by at least one selected from the group consisting of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, a method according to each embodiment of the present invention can be implemented by modules, procedures, and/or functions for performing the above-explained functions or operations. Software code is stored in a memory unit and is then drivable by a processor.

The memory unit is provided within or outside the processor to exchange data with the processor through the various means known in public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

Industrial Applicability

Although the method of transmitting and receiving a D2D (device-to-device) signal in a wireless communication system and an apparatus therefor are described centering on examples applied to 3GPP LTE system, it may be applicable to various wireless communication systems as well as to the 3GPP LTE system.

What is claimed is:

1. A method of transmitting control information by a device in a wireless communication system, the method comprising:
   receiving a downlink signal from a base station in a first time unit;
   when a second time unit is a time unit for a device-to-device (D2D) communication, shifting a transmission time of an acknowledgement/negative-acknowledgement (ACK/NACK) signal about the downlink signal to transmit the ACK/NACK signal in a time unit for a non-D2D communication after the second time unit; and
   when the second time unit is a time unit for the non-D2D communication, transmitting the ACK/NACK signal in the second time unit,
   wherein an index of the first time unit is a positive integer n, and an index of the second time unit is (n+k), wherein k denotes a predetermined positive integer indicating an ACK/NACK transmission timing.

2. The method of claim 1, wherein the downlink signal is received via a physical downlink shared channel.

3. The method of claim 1, wherein if the second time unit is the time unit for the D2D communication, the transmission time of the ACK/NACK signal is shifted by shifting a hybrid automatic repeat request (HARD) process for the downlink signal.

4. The method of claim 1, wherein k is equal to 4.

5. The method of claim 1, wherein a time unit includes at least one of subframe, slot or resource block.

6. A device for transmitting control information in a wireless communication system, the device comprising:
   a transceiver to transmit/receive a signal; and
   a processor operably coupled with the transceiver and configured to:
   receive, via the transceiver, a downlink signal from a base station in a first time unit;
   when a second time unit is a time unit for a device-to-device (D2D) communication, shift a transmission time of an acknowledgement/negative-acknowledgement (ACK/NACK) signal about the downlink signal to transmit the ACK/NACK signal in a time unit for a non-D2D communication after the second time unit; and
   when the second time unit is a time unit for the non-D2D communication, transmit, via the transceiver, the ACK/NACK signal in the second time unit,
   wherein an index of the first time unit is a positive integer n, and an index of the second time unit is (n+k), wherein k denotes a predetermined positive integer indicating an ACK/NACK transmission timing.

7. The device of claim 6, wherein the downlink signal is received via a physical downlink shared channel.

8. The device of claim 6, wherein if the second time unit is the time unit for the D2D communication, the transmission time of the ACK/NACK signal is shifted by shifting a hybrid automatic repeat request (HARD) process for the downlink signal.

9. The device of claim 6, wherein k is equal to 4.

10. The device of claim 6, wherein a time unit includes at least one of subframe, slot or resource block.

* * * * *